(12) United States Patent
Dalbir Singh

(10) Patent No.: US 11,989,121 B2
(45) Date of Patent: May 21, 2024

(54) FEATURE INTERACTION CONTINUITY TESTING

(71) Applicant: Dell Products L.P., Round Rock, TX (US)

(72) Inventor: Ranjodh Singh Dalbir Singh, Pulau Pinang (MY)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 17/648,574

(22) Filed: Jan. 21, 2022

(65) Prior Publication Data

US 2023/0236957 A1 Jul. 27, 2023

(51) Int. Cl.
G06F 11/00 (2006.01)
G06F 11/36 (2006.01)

(52) U.S. Cl.
CPC ...... *G06F 11/3688* (2013.01); *G06F 11/3684* (2013.01)

(58) Field of Classification Search
CPC .................. G06F 11/3684; G06F 11/3688
See application file for complete search history.

(56) References Cited

U.S. PATENT DOCUMENTS

| | | | |
|---|---|---|---|
| 9,311,224 B1* | 4/2016 | Cohen ................. | G06F 11/3684 |
| 10,824,541 B1* | 11/2020 | Kongara ................. | G06F 8/71 |
| 10,846,210 B1* | 11/2020 | Singh ................. | G06F 8/71 |
| 2005/0283340 A1* | 12/2005 | Mathur ............... | G06F 11/2284 |
| | | | 702/183 |
| 2007/0234314 A1* | 10/2007 | Godwin .............. | G06F 11/3684 |
| | | | 717/124 |
| 2014/0082420 A1* | 3/2014 | Greer ................. | G06F 11/3684 |
| | | | 714/33 |
| 2016/0328316 A1* | 11/2016 | Balsavias ........... | G06F 11/3684 |
| 2020/0242015 A1* | 7/2020 | Catt .................... | G06F 11/3692 |
| 2023/0195602 A1* | 6/2023 | Gilbertson ......... | G01R 31/3274 |
| | | | 714/38.1 |

* cited by examiner

*Primary Examiner* — Joshua P Lottich
(74) *Attorney, Agent, or Firm* — DALY, CROWLEY, MOFFORD & DURKEE, LLP

(57) ABSTRACT

A method including: storing, in a memory, a test database, the test database including a plurality of test definitions, each test definition being associated with a respective base application feature and a respective destination application feature; detecting a request to generate a testing plan; generating the testing plan in response to the request, the testing plan being generated by using the test database, the testing plan identifying a sequence of at least some of the test definitions that are part of the test database; and outputting an indication of the testing plan for presentation to a user.

17 Claims, 8 Drawing Sheets

```
BASE APPLICATION FEATURE:    HOME PAGE
TARGET APPLICATION FEATURE:  LOGIN PAGE
ACTION(S):  CHECK VALIDITY OF DISPLAYED INFORMATION
            ENTER INVALID USER NAME
            ENTER VALID PASSWORD
            CLICK "LOGIN" BUTTON
```
⎯302

```
BASE APPLICATION FEATURE:    HOME PAGE
TARGET APPLICATION FEATURE:  DESTINATIONS PAGE
ACTION(S):  CHECK VALIDITY OF DISPLAYED INFORMATION
            CLICK "SECURE PURCHASE" BUTTON
```
⎯304

```
BASE APPLICATION FEATURE:    BOOK FLIGHT PAGE
TARGET APPLICATION FEATURE:  BOOK FLIGHT PAGE
ACTION(S):  CHECK VALIDITY OF DISPLAYED INFORMATION
            ENTER VALID FIRST NAME
            ENTER INVALID LAST NAME
            ENTER VALID CREDIT CARD NUMBER
            CLICK "SECURE PURCHASE" BUTTON
```
⎯306

```
BASE APPLICATION FEATURE:    BOOK FLIGHT PAGE
TARGET APPLICATION FEATURE:  FLIGHT CONFIRMATION PAGE
ACTION(S):  CHECK VALIDITY OF DISPLAYED INFORMATION
            ENTER VALID FIRST NAME
            ENTER VALID LAST  NAME
            ENTER VALID CREDIT CARD NUMBER
            CLICK "SECURE PURCHASE" BUTTON
```
⎯308

```
BASE APPLICATION FEATURE:    BOOK FLIGHT PAGE
TARGET APPLICATION FEATURE:  FLIGHT CONFIRMATION PAGE
ACTION(S):  CHECK VALIDITY OF DISPLAYED INFORMATION
            ENTER VALID FIRST NAME
            ENTER VALID LAST NAME
            ENTER INVALID CREDIT CARD NUMBER
            CLICK "SECURE PURCHASE" BUTTON
```
⎯310

FIG. 3

| | 402A | 402B | 402C | 402D | 402E | 402F |
|---|---|---|---|---|---|---|
| HOME PAGE 213A | TEST DEFINTIION #1 304 | TEST DEFINTIION #2 | TEST DEFINTIION #3 302 | TEST DEFINTIION #4 | | |
| SELECT FLIGHT PAGE 213B | TEST DEFINTIION #5 502 | TEST DEFINTIION #6 | | | | |
| BOOK FLIGHT PAGE 213C | TEST DEFINTIION #7 308 | TEST DEFINTIION #8 | TEST DEFINTIION #9 306 | TEST DEFINTIION #10 310 | TEST DEFINTIION #11 504 | TEST DEFINTIION #12 |
| FLIGHT CONFIRMATION PAGE 213D | TEST DEFINTIION #13 | TEST DEFINTIION #14 | TEST DEFINTIION #15 508 | TEST DEFINTIION #16 | | |
| DESTINATIONS PAGE 213E | TEST DEFINTIION #17 | TEST DEFINTIION #18 506 | | | | |
| LOGIN PAGE 213F | TEST DEFINTIION #19 | | | | | |

BASE APPLICATION FEATURE: SELECT FLIGHT PAGE
DESTINATION APPLICATION FEATURE: BOOK FLIGHT PAGE
ACTION(S): CHECK VALIDITY OF DISPLAYED INFORMATION
         ENTER VALID DEPARTURE FLIGHT
         ENTER VALID RETURN FLIGHT
         CLICK "CONTINUE" BUTTON     502

BASE APPLICATION FEATURE: BOOK FLIGHT PAGE
TARGET APPLICATION FEATURE: DESTINATIONS PAGE
ACTION(S): CHECK VALIDITY OF DISPLAYED INFORMATION
         CLICK "SECURE PURCHASE" BUTTON     504

BASE APPLICATION FEATURE: DESTINATIONS PAGE
DESTINATION APPLICATION FEATURE: BOOK FLIGHT PAGE
ACTION(S): CLICK "BACK TO BOOK" BUTTON     506

BASE APPLICATION FEATURE: BOOK FLIGHT PAGE
TARGET APPLICATION FEATURE: FLIGHT CONFIRMATION PAGE
ACTION(S): CHECK VALIDITY OF DISPLAYED INFORMATION
         ENTER VALID FIRST NAME
         ENTER VALID LAST NAME
         ENTER INVALID CREDIT CARD NUMBER
         CLICK "SECURE PURCHASE" BUTTON     310

BASE APPLICATION FEATURE: FLIGHT CONFIRMATION PAGE
DESTINATION APPLICATION FEATURE: HOME PAGE
ACTION(S): CLICK "LOGOUT" BUTTON     508

BASE APPLICATION FEATURE: HOME PAGE
TARGET APPLICATION FEATURE: LOGIN PAGE
ACTION(S): CHECK VALIDITY OF DISPLAYED INFORMATION
         ENTER INVALID USER NAME
         ENTER VALID PASSWORD
         CLICK "LOGIN" BUTTON     302

FIG. 5

FEATURE INTERACTION CONTINUITY TESTING

BACKGROUND

Software testing is an investigation conducted to assess the quality of software. Software testing can be a labor-intensive process, as the testing of complex software may require the execution of hundreds and even thousands of tests. The use of automated testing platforms may help increase the efficiency at which software testing is performed.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided comprising: storing, in a memory, a test database, the test database including a plurality of test definitions, each test definition being associated with a respective base application feature and a respective destination application feature; detecting a request to generate a testing plan; generating the testing plan in response to the request, the testing plan being generated by using the test database, the testing plan identifying a sequence of at least some of the test definitions that are part of the test database; and outputting an indication of the testing plan for presentation to a user.

According to aspects of the disclosure, a system is provided, comprising: a memory; and at least one processor that is operatively coupled to the memory, the at least one processor being configured to perform the operations of: storing, in a memory, a test database, the test database including a plurality of test definitions, each test definition being associated with a respective base application feature and a respective destination application feature; detecting a request to generate a testing plan; generating the testing plan in response to the request, the testing plan being generated by using the test database, the testing plan identifying a sequence of at least some of the test definitions that are part of the test database; and outputting an indication of the testing plan for presentation to a user.

According to aspects of the disclosure, a non-transitory computer-readable medium is provided that stores one or more processor-executable instructions, which, when executed by at least one processor, cause the at least one processor to perform the operations of: storing, in a memory, a test database, the test database including a plurality of test definitions, each test definition being associated with a respective base application feature and a respective destination application feature; detecting a request to generate a testing plan; generating the testing plan in response to the request, the testing plan being generated by using the test database, the testing plan identifying a sequence of at least some of the test definitions that are part of the test database; and outputting an indication of the testing plan for presentation to a user.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram illustrating examples of test definitions, according to aspects of the disclosure;

FIG. 4 is a diagram of an example of a test database, according to aspects of the disclosure;

FIG. 5 is a diagram of an example of a testing plan, according to aspects of the disclosure;

DETAILED DESCRIPTION

In practice, many software defects, particularly high-severity defects, are found using the expert testing method. However, the depth of expert testing varies between test engineers. For example, some engineers may lack the skills to perform expert testing efficiently. As another example, engineers who constantly perform expert testing often experience "burnout" whereby they are incapacitated in their ability to perform expert testing efficiently or generate new expert testing scenarios.

According to the present disclosure, a method is provided for expert testing of software, which is herein referred to as "feature interaction continuity testing." Feature interaction continuity testing may expand the testing capabilities of engineers by automatically generating expert testing scenarios. According to the present disclosure, it has been determined that feature interaction continuity testing is effective at uncovering software defects.

In some implementations, the workings of feature interaction continuity testing are such that every interaction with software that is being tested will produce a certain state. Feature interaction continuity testing will then take the newly-produced state of the interaction as the current active state and then interact with another event to produce a new state of the software being tested and so forth. Feature interaction continuity testing may have several advantages over traditional expert testing techniques. In some respects, feature continuity testing may help increase the test coverage of software. Furthermore, feature continuity testing may help improve Phase Containment Effectiveness (PCE) and reduce Cost of Poor Quality (CoPQ) as more defects are uncovered earlier during testing. And still furthermore, the use of feature continuity testing may help test engineers to improve their test efficiency rate.

Figure 1:
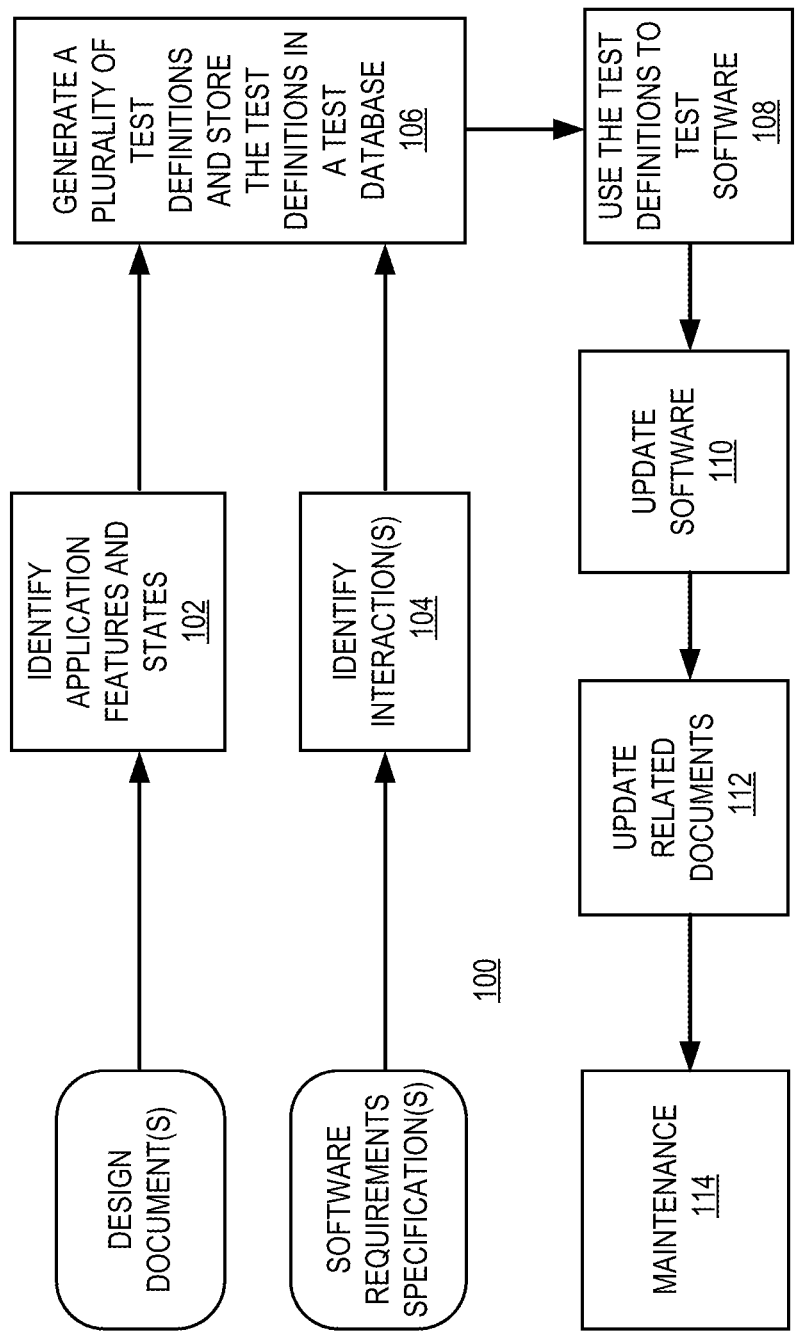
FIG. 1 is a flowchart of an example of a process, according to aspects of the disclosure.

FIG. 1 is a diagram of an example of a process 100 for performing feature interaction continuity testing. At step 102, a plurality of application features and/or states of software are identified. The software may include a single software application or multiple software applications that are provided by different vendors, and which interact with one another. The application features may be identified by using document design documents that are associated with the application features. At step 104, a plurality of interactions between the application features (identified at step 102) is determined. The interactions may be determined from software requirements specification(s) associated with the application features and/or by talking with developers. At step 106, a plurality of test definitions is generated and stored in a test database. The test database may be the same or similar to the test database 222, which is discussed further below with respect to FIGS. 2 and 4. The test definitions may be the same or similar to the test definitions 302-310 and 502-508, which are discussed further below with respect to FIGS. 3 and 5, respectively. In some implementations, each of the test definitions may be generated based on information obtained at step 102 and/or step 104. Additionally or alternatively, in some implementations, each of the test definitions may be generated manually. At step 108, the test definitions generated at step 108 are used to test the software (whose application features are identified at step 102). At step 110, the software is updated to correct any defects that are uncovered during the test execution. At step 112, documents related to the updates are modified to provide information about the updates. The updated documents may include design documents and/or any other suitable type of document. At step 114, additional maintenance is performed on the software.

Figure 2:
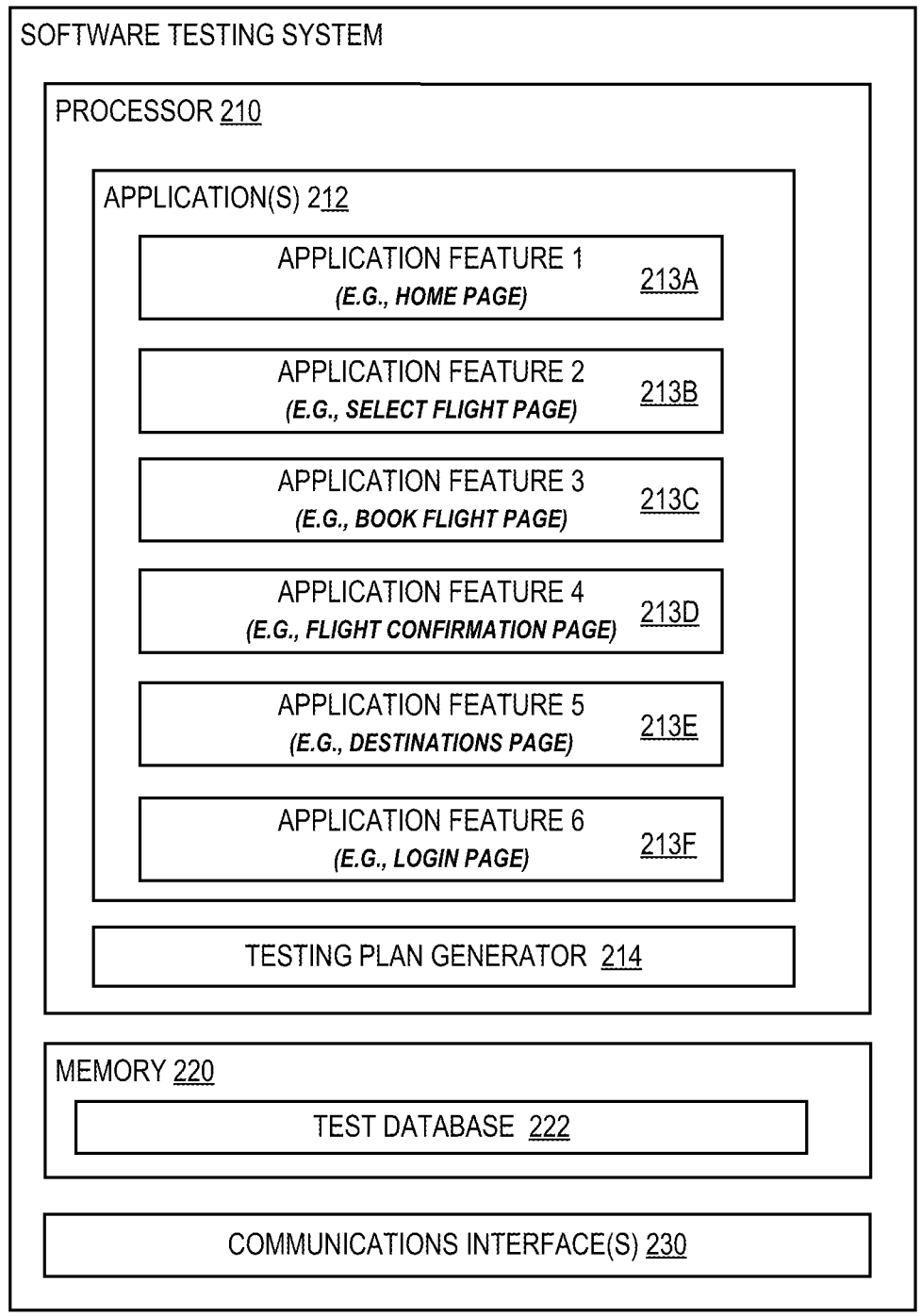
FIG. 2 is a diagram of an example of a software testing system, according to aspects of the disclosure.

FIG. 2 is a diagram of an example of a software testing system 200, according to aspects of the disclosure. The system 200 may include a processor 210, a memory 220, and a communications interface 230. The processor 210 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 220 may include any suitable type of volatile and/or non-volatile memory. In some implementations, the memory 220 may include one or more of a random-access memory (RAM), a dynamic random memory (DRAM), a flash memory, a hard drive (HD), a solid-state drive (SSD), a network accessible storage (NAS), and or any other suitable type of memory device. The communications interface 230 may include any suitable type of communications interface, such as one or more Ethernet adapters, one or more Wi-Fi adapters (e.g., 802.1414 adapters), and one or more Long-Term Evolution (LTE) adapters, for example. Although in the example of FIG. 2 the system 200 is depicted as an integrated system, alternative implementations are possible in which the system 200 is a distributed system including a plurality of computing devices that are coupled to one another via a communications network.

The processor 210 may be configured to execute one or more applications 212 and a testing plan generator 224. The memory 220 may be configured to store a test database 222.

The application(s) 212 may include one or more applications that are desired to be tested. The application(s) 212, in the present example, correspond to software implementing a website for reservation of airline tickets, or a set of services that implement the functionality of the website. The application(s) 212 may include application features 213A-F. Application feature 213A may correspond to a home page of the website, application feature 213B may correspond to a select flight page of the website, application feature 213C may correspond to a book flight page of the website, application feature 213D may correspond to a flight confirmation page of the website, application feature 213E may correspond to a destinations page of the website, and application feature 213F may correspond to a login page of the website. The application features 213A-F are provided as an example, and the present disclosure is not limited to any specific type of application features and/or software being tested. In some implementations, all of the application features 213A-F may be part of the same application (or software suite). Additionally or alternatively, in some implementations, any two of application features 213A-F may be part of different applications or software suites. For example, feature 213C (e.g., book flight page) may be provided by part of the reservation system of an airline, whereas features 213A-B and 213D-F may be part of the website of a travel agency.

The testing plan generator 214 may include software for generating testing plans for testing the application features 213A-F, as well as the interactions between them. An example of a testing plan 500, which may be generated by the testing plan generator 214, is provided further below with respect to FIG. 5. In some implementations, the testing plan generator 214 may be configured to generate a testing plan by executing the process 600, which is discussed further below with respect to FIG. 6. Additionally or alternatively, in some implementations, the testing plan generator 214 may be configured to generate a testing plan by executing the process 800, which is discussed further below with respect to FIG. 8.

The test database 222 may be configured to store one or more test definitions. In some implementations, the test database 222 may include a file (or another object) that stores the test definitions. Additionally or alternatively, in some implementations, the test database 222 may include a plurality of files (or other objects), each of which is configured to store a different portion of the set of test definitions. Additionally or alternatively, in some implementations, the test database 222 may include a relational database or another type of database. Stated succinctly, the present disclosure is not limited to any specific implementation of the test database 222. Although in the example of FIG. 2, the test database 222 is depicted as being stored in the memory of the system 200, it will be understood that alternative implementations are possible in which the test database 222 is stored in the memory of one or more other devices. An example of one possible implementation of the test database 222 is provided further below with respect to FIG. 4.

As used throughout the disclosure, the term "application feature" may refer to a portion of a software application. For example, an application feature may include source code that implements a particular application functionality. As another example, an application feature may include a screen from the graphical user interface (GUI) of the application and/or code implementing the underlying functionality of the screen. As another example, an application feature may include a portion of a GUI screen of an application and/or code implementing the underlying functionality of the portion. The term "software application" may refer to any software, including, but not limited to, the software for a website, an operating system, a web service, a microservice, enterprise software, productivity software, device drivers, etc.

FIG. 3 is a diagram showing examples of test definitions, according to aspects of the disclosure. More particularly, FIG. 3 shows examples of the test definitions 302-310. Each of the test definitions 302-310 is associated with a test that involves the provision of input into an application feature. Each of test definitions 302-310 is associated with a base application feature and a destination application feature. Each of test definitions 302-310 specifies input that needs to be provided into the base application feature of that definition. The input may be provided as part of the test defined by the test definition. Any of the test definitions 302-310 may also specify additional actions that may be performed as part of the test defined by the test definition (e.g., check the validity of information, etc.).

In some respects, each of the test definitions 302-310 may define a test for testing the interaction between the definition's respective base application feature and the definition's respective destination application feature. The respective base application feature of any of the test definitions 302-310 may be configured to execute code that is part of the respective destination application feature of the same test definition. The code of the respective destination application feature may be executed by calling an API of the destination application feature or in any other suitable manner. The code of the respective destination application feature may be executed in response to the user providing specific input that is specified by the test definition (e.g., in response to the user pressing a specified button, etc.) In some implementations, the code of the respective destination application feature may be executed based on input parameters that are input by the user, and which are specified by the test definition.

According to the present disclosure, the base application feature of any given test definition is the application feature into which the input associated with the test definition is entered. The destination application feature of the given test definition is an application feature that is executed (or otherwise invoked) based on the input that is provided to the base application feature. The input that is provided into the base application feature (of the given test definition) may include: (i) typing of text or other data that into the user interface of the base application feature and/or (ii) activating a particular input component (e.g., pressing a button) of the user interface of the base application feature.

Test definition 302 defines a first test. The base application feature of test definition 302 is feature 213A and the destination application feature of test definition 302 is feature 213F. Test definition 302 provides that, when a user is executing the first test, the user must (i) check the validity of information that is displayed in the user interface of the base application feature of test definition 302, (ii) enter an invalid user name into a field of the user interface of the base application feature of test definition 302, (iii) enter a valid password in the user interface of the base application feature of test definition 302, and (iv) press a "login" button that is provided in the user interface of the base application feature of test definition 302. Pressing the "login" button may cause the user interface of the destination application feature of test definition 302 to be displayed and/or cause code that is part of the destination application feature of test definition 302 to be executed based on the information input at steps ii-iii.

Test definition 304 defines a second test. The base application feature of test definition 304 is feature 213A and the destination application feature of test definition 304 is feature 213E. Test definition 304 provides that, when the user is executing the second test, the user must (i) check the validity of information that is displayed in the user interface of the base application feature of test definition 304, and (ii) press a "secure purchase" button that is provided in the user interface of the base application feature of test definition 304. Pressing the "secure purchase" button may cause the user interface of the destination application feature of test definition 304 to be displayed and/or cause code that is part of the destination application feature of test definition 304 to be executed.

Test definition 306 defines a third test. The base application feature of test definition 306 is feature 213C and the destination application feature of test definition 306 is feature 213C. Test definition 306 provides that, when the user is executing the third test, the user must (i) check the validity of information that is displayed in the user interface of the base application feature of test definition 306, (ii) enter a valid first name in the user interface of the base application feature of test definition 306, (iii) enter an invalid last name in the user interface of the base application feature of test definition 306, (iv) enter a valid credit card number in the user interface of the base application feature of test definition 306, and (v) press a "secure purchase" button that is provided in the user interface of the base application feature of test definition 306. Pressing the "secure purchase" button may cause the user interface of the destination application feature of test definition 306 to be displayed and/or cause code that is part of the destination application feature of test definition 306 to be executed based on the information input at steps ii-iv.

Test definition 308 defines a fourth test. The base application feature of test definition 308 is feature 213C and the destination application feature of test definition 308 is feature 213D. Test definition 308 provides that, when the user is executing the fourth test, the user must (i) check the validity of information that is displayed in the user interface of the base application feature of test definition 308, (ii) enter a valid first name in the user interface of the base application feature of test definition 308, (iii) enter a valid last name in the user interface of the base application feature of test definition 308, (iv) enter a valid credit card number in the user interface of the base application feature of test definition 308, and (v) press a "secure purchase" button that is provided in the user interface of the base application feature of test definition 308. Pressing the "secure purchase" button may cause the user interface of the destination application feature of test definition 308 to be displayed and/or cause code that is part of the destination application feature of test definition 308 to be executed based on the information input at steps ii-iv.

Test definition 310 defines a fifth test. The base application feature of test definition 310 is feature 213C and the destination application feature of test definition 310 is feature 213D. Test definition 310 provides that, when the user is executing the fifth test, the user must (i) check the validity of information that is displayed in the user interface of the base application feature of test definition 310, (ii) enter a valid first name in the user interface of the base application feature of test definition 310, (iii) enter a valid last name in the user interface of the base application feature of test definition 310, (iv) enter an invalid credit card number in the user interface of the base application feature of test definition 310, and (v) press a "secure purchase" button that is provided in the user interface of the base application feature of test definition 310. Pressing the "secure purchase" button may cause the user interface of the destination application feature of test definition 310 to be displayed and/or cause code that is part of the destination application feature of test definition 310 to be executed based on the information input at steps ii-iv.

FIG. 4 is a diagram of the test database 222, according to aspects of the disclosure. As illustrated, the test database 222 may include a plurality sets 402A-F of test definitions. As used throughout the disclosure, the term "set of test definitions" shall refer to a set of one or more test definitions. In the example of FIG. 4, the set 402A includes test definitions in which feature 213A is the base application feature. Set 302B includes test definitions in which feature 213B is the base application feature. Set 302C includes test definitions in which feature 213C is the base application feature. Set 302D includes test definitions in which feature 213D is the base application feature. Set 302E includes test definitions in which feature 213E is the base application feature. Set 302F includes a test definition in which feature 213F is the base application feature. In the example of FIG. 4, among the definitions included in set 402A are the test definitions 302 and 304 (shown in FIG. 3). Among the definitions included in set 402B is a test definition 502 (shown in FIG. 5). Among the definitions included in set 402C are the test definitions 306-310 (shown in FIG. 3) and test definition 508 (shown in FIG. 5). Among the definitions included in set 402D is a test definition 508 (shown in FIG. 5). Among the definitions included in set 402E is a test definition 506 (shown in FIG. 5).

FIG. 5 is a diagram of testing plan 500, according to aspects of the disclosure. Testing plan 500 is a testing plan for feature interaction continuity testing. The testing plan 500 identifies a sequence of test definitions. More particularly, the testing plan 500 identifies what tests need to be performed and in what order (during a particular bout of testing). In the present example, testing plan 500 identifies a sequence including test definitions 502, 504, 506, 310, 508, and 302. Furthermore, testing plan 500 provides that the test associated with test definition 502 needs to be performed first, the test associated with test definition 504 needs to be performed second, the test associated with test definition 506 needs to be performed third, the test associated with test definition 310 needs to be performed fourth, the test associated with test definition 508 needs to be performed fifth, and the test associated with test definition 302 needs to be performed sixth, or last.

Test definition 502 defines a sixth test. The base application feature of test definition 502 is feature 213B and the destination application feature of test definition 502 is feature 213C. Test definition 502 provides that, when the user is executing the fifth test, the user must (i) check the validity of information that is displayed in the user interface of the base application feature of test definition 502 (ii) enter a valid departure flight identifier in the user interface of the base application feature of test definition 502, (iii) enter a valid return flight identifier in the user interface of the base application feature of test definition 502, and (iv) press a "continue" button that is provided in the user interface of the base application feature of test definition 502. Pressing the "continue" button may cause the user interface of the destination application feature of test definition 502 to be displayed and/or cause code that is part of the destination application feature of test definition 502 to be executed based on the information input at steps ii-iii.

Test definition 504 defines a seventh test. The base application feature of test definition 504 is feature 213C and the destination application feature of test definition 504 is feature 213E. Test definition 504 provides that, when the user is executing the seventh test, the user must (i) check the validity of information that is displayed in the user interface of the base application feature of test definition 504, and (ii) press a "secure purchase" button that is provided in the user interface of the base application feature of test definition 504. Pressing the "continue" button may cause the user interface of the destination application feature of test definition 504 to be displayed and/or cause code that is part of the destination application feature of test definition 504 to be executed.

Test definition 506 defines an eighth test. The base application feature of test definition 506 is feature 213E and the destination application feature of test definition 506 is feature 213C. Test definition 506 provides that, when the user is executing the eighth test, the user must: (i) press a "back to book" button that is provided in the user interface of the base application feature of test definition 506. Pressing the "back to book" button may cause the user interface of the destination application feature of test definition 506 to be displayed and/or cause code that is part of the destination application feature of test definition 506 to be executed.

Test definition 508 defines a ninth test. The base application feature of test definition 508 is feature 213D and the destination application feature of test definition 508 is feature 213A. Test definition 508 provides that, when the user is executing the ninth test, the user must: (i) press a "logout" button that is provided in the user interface of the base application feature. Pressing the "logout" button may cause the user interface of the destination application feature of test definition 508 to be displayed and/or cause code that is part of the destination application feature of test definition 508 to be executed.

As illustrated in FIG. 5, the test definitions in the sequence of testing plan 500 may be daisy-chained. That is, the destination application feature of any given test definition in the sequence (except for the last one) is the base application feature of the test definition that immediately follows the given test definition in the sequence. For example, the destination application feature of the first test definition in the sequence (i.e., test definition 502) is the base application feature of the second test definition in the sequence (i.e., test definition 504); the destination application feature of the second test definition in the sequence (i.e., test definition 504) is the base application feature of the third test definition in the sequence (i.e., test definition 506); the destination application feature of the third test definition in the sequence (i.e., test definition 506) is the base application feature of the fourth test definition in the sequence (i.e., test definition 310); the destination application feature of the fourth test definition in the sequence (i.e., test definition 310) is the base application feature of the fifth test definition in the sequence (i.e., test definition 508); and the destination application feature of the fifth test definition in the sequence (i.e., test definition 508) is the base application feature of the sixth test definition in the sequence (i.e., test definition 302);

Similarly, the base application feature of any given test definition in the sequence (except for the first one) is the destination application feature of the test definition that immediately precedes the given test definition in the sequence. For example, the base application feature of the second test definition in the sequence (i.e., test definition 504) is the destination application feature of the first test definition in the sequence (i.e., test definition 502); the base application feature of the third test definition in the sequence (i.e., test definition 506) is the destination application feature of the second test definition in the sequence (i.e., test definition 504); the base application feature of the fourth test definition in the sequence (i.e., test definition 310) is the destination application feature of the third test definition in the sequence (i.e., test definition 506); the base application feature of the fifth test definition in the sequence (i.e., test definition 508) is the destination application feature of the fourth test definition in the sequence (i.e., test definition 310); and the base application feature of the sixth test definition in the sequence (i.e., test definition 302) is the destination application feature of the fifth test definition in the sequence (i.e., test definition 508).

Daisy-chaining the test definitions in the testing plan 500 allows the tests specified in test plan 500 to follow continuously in the same execution flow of the software that is being tested (i.e., without the user having to reset the execution flow). In some respects, this is advantageous because it increases the speed and/or efficiency at which the tests specified by the test plan 500 can be performed.

Figure 6:
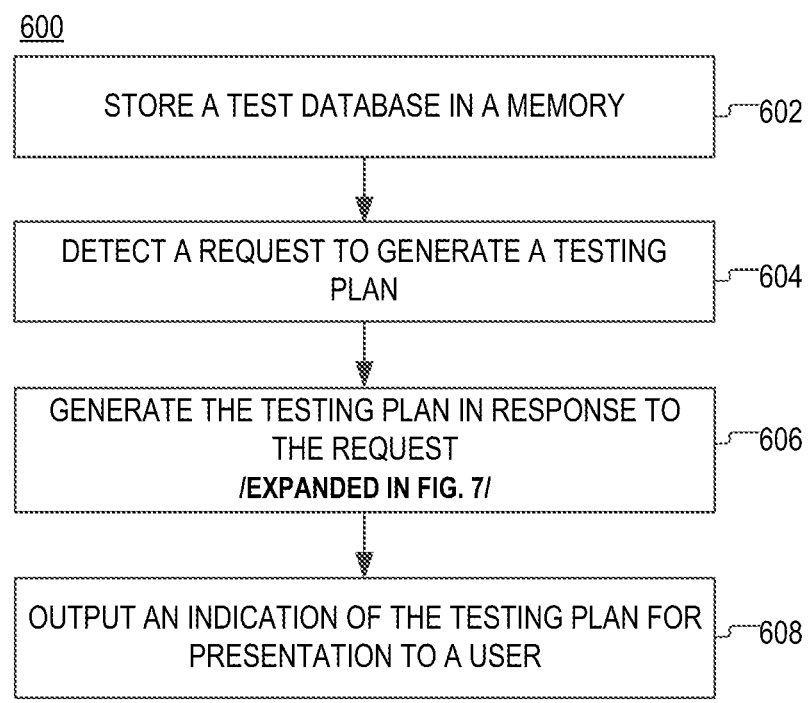
FIG. 6 is a flowchart of an example of a process, according to aspects of the disclosure.

FIG. 6 is a diagram of an example of a process 600, according to aspects of the disclosure. According to the example of FIG. 6, the process 600 is performed by the software testing system 200. However, the present disclosure is not limited to any specific entity (or set of entities) performing the process 600.

At step 602, a test database is stored in a memory. The test database may be the same or similar to the test database 222, which is discussed above with respect to FIGS. 2 and 4. The test database may be stored in the memory of the system 200 and/or the memory of another computing device or system. In addition, in some implementations, different parts of the test database may be stored in the respective memories of different computing devices. In this regard, it will be understood that the term memory as used in the phrase "storing a test database in a memory" may refer to the memory of a single computing device or the respective memories of different computing devices.

At step 604, the system 200 detects a request to generate a testing plan for a feature interaction continuity test. The request, according to the present example, is received via one or more input devices of the system 200 (e.g., a keyboard and a mouse, or a microphone). However, alternative implementations are possible in which the request is received over a communications network from a user terminal.

At step 606, the system 200 generates a testing plan in response to the request. The testing plan may be the same or similar to the testing plan 500, which is discussed above with respect to FIG. 5. The testing plan may be generated in accordance with a process 700, which is discussed further below with respect to FIG. 7.

At step 608, an indication of the testing plan (generated at step 606) is output for presentation to a user. Outputting the indication of the testing plan may include displaying the testing plan (or part of) on a display of the system 200. Additionally or alternatively, in some implementations, outputting the indication of the testing plan may include transmitting the testing plan (or part of) to a remote terminal of the user. Additionally or alternatively, in some implementations, outputting the indication of the testing plan may include storing the testing plan (or part of) at a predetermined location in the memory of the system 200 (or another system) for viewing in the future. In some implementations, after the testing plan is presented, the user may test the software associated with the testing plan by performing the steps outlined in each of the test definitions of the test plan.

The present disclosure is not limited to any specific type of information being included in the request (received at step 604). In some implementations, the request (received at step 604) may specify a total count of test definitions that are required to be included in the testing plan. Additionally or alternatively, in some implementations, the request may identify the starting point of the testing plan. The term "starting point of a testing plan", as used herein, refers to an application feature that would be tested first (or an application in which the user would input information or interact first when the user begins executing the testing plan). Additionally or alternatively, in some implementations, the request may specify a set of application features that are requested to be tested with the testing plan. For example, in some implementations, the request may identify a set S of application features that are desired to be tested. In some implementations, when the request specifies a set S of application features that are desired to be tested, the system 200 may generate the testing plan (at step 606), such that each member of the set S is a destination application feature of at least one test definition that is part of the testing plan. Additionally or alternatively, in some implementations, when the request specifies a set S of application features that are desired to be tested, the system 200 may generate the testing plan (at step 606), such that each member of the set S is a base application feature of at least one test definition that is part of the testing plan. Additionally or alternatively, in some implementations, when the request specifies a set S of application features that are desired to be tested, the system 200 may generate the testing plan (at step 606), such that each member of the set S is either a base application feature and/or destination application feature of at least one test definition that is part of the testing plan.

Figure 7:
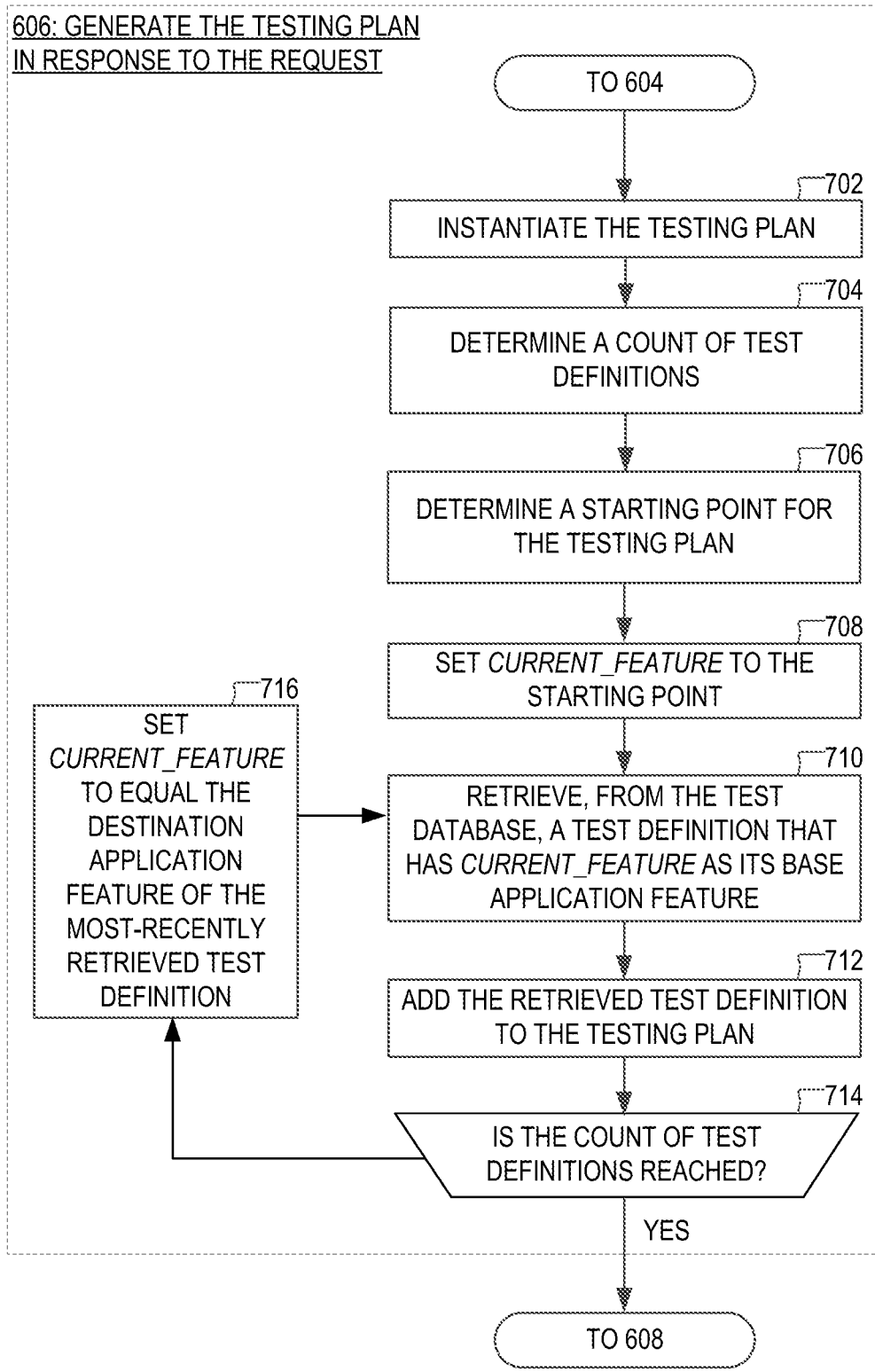
FIG. 7 is a flowchart of an example of a process, according to aspects of the disclosure.

FIG. 7 is a flowchart of a process 700 for generating a testing plan, as specified by step 606 of the process 600.

At step 702, the system 200 instantiates the testing plan.

At step 704, the system 200 determines a count of test definitions that need to be included in the testing plan. In some implementations, the count of test definitions may be specified in the request (received at step 604). However, the present disclosure is not limited to any specific method for determining the count. For example, the count may be hardcoded in the system 200, etc.

At step 706, the system 200 determines the starting point of the testing plan. In some implementations, the starting point may be specified in the request (received at step 702). However, the present disclosure is not limited to any specific method for selecting the starting point. For example, the starting point may be hardcoded in the system 200 or selected at random.

At step 708, the system 200 sets variable CURRENT_FEATURE to equal the starting point.

At step 710, the system 200, retrieves, from the test database (stored in memory at step 602), a test definition in which the application feature identified by CURRENT_FEATURE is the base application feature. In some implementations, the test definition may be one which has not been selected earlier in the same execution of the process 700 (i.e., during a previous iteration of steps 710-714).

At step 712, the system 200 adds the retrieved test definition to the testing plan (instantiated at step 702).

At step 714, the system 200 detects if the count (determined at step 704) has been reached. In other words, the system 200 determines whether, after the most recent execution of step 712, the testing plan (instantiated at step 702) contains as many test definitions as indicated by the count. If the count has been reached, the process 700 returns to step 608 of the process 600. Otherwise, if the count has not been reached, the process 700 proceeds to step 716.

At step 716, the system 200 sets variable CURRENT_FEATURE to equal the destination application feature of the test definition that is retrieved as a result of the most recent execution of step 710.

Figure 8:
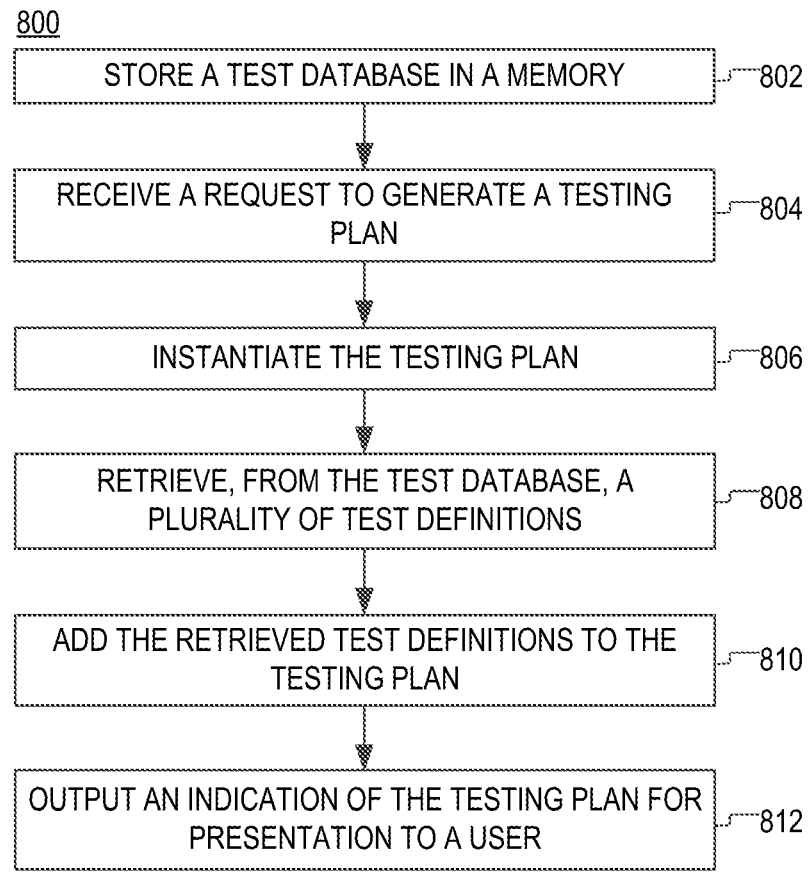
FIG. 8 is a flowchart of an example of a process, according to aspects of the disclosure.

FIG. 8 is a flowchart of an example of a process 800 for generating a targeted test. According to the example of FIG. 8, the process 800 is performed by the software testing system 200. However, the present disclosure is not limited to any specific entity (or set of entities) performing the process 800.

At step 802, a test database is stored in a memory. The test database may be the same or similar to the test database 222, which is discussed above with respect to FIGS. 2 and 4. The test database may be stored in the memory of the system 200 and/or the memory of another computing device or system. In addition, in some implementations, different parts of the test database may be stored in the respective memories of different computing devices.

At step 804, a request is received to generate a testing plan. According to the present example, the requested testing plan is one that is skewed heavily towards testing a specific application feature, which is herein referred to as a "target feature." The target feature may be specified in the request. In some implementations, the request may specify the total count of test definitions that are desired to be included in the testing plan. Additionally or alternatively, in some implementations, the request may identify one or more additional application features that are desired to be tested alongside the target feature. The request, according to the present example, is received via one or more input devices of the system 200 (e.g., a keyboard and a mouse, or a microphone). However, alternative implementations are possible in which the request is received over a communications network from a user terminal. It will be understood that the present disclosure is not limited to any specific type of information being contained in the request.

At step 806, the system 200 instantiates a testing plan.

At step 808, the system 200 retrieves, from the test database (stored in memory at step 802), a plurality of test definitions in all of which (or most of which) the target application feature is either the base application feature or the destination application feature. In some implementations, the system 200 may retrieve only test definitions which have the target application feature as their base application feature. Additionally or alternatively, in some implementations, the system 200 may retrieve only test definitions which have the target application feature as their destination application feature. Additionally or alternatively, in some implementations, the system 200 may retrieve only test definitions which have the target application feature as either their destination application feature or their base application feature.

At step 810, the system 200 inserts the retrieved test definitions in the testing plan (instantiated at step 806).

At step 812, the system 200 outputs an indication of the testing plan for presentation to a user. Outputting the indication of the testing plan may include displaying the testing plan (or part of) on a display of the system 200. Additionally or alternatively, in some implementations, outputting the indication of the testing plan may include transmitting the testing plan (or part of) to a remote terminal of the user. Additionally or alternatively, in some implementations, outputting the indication of the testing plan may include storing the testing plan (or part of) at a predetermined location in the memory of the system 200 (or another system) for viewing in the future. In some implementations, after the testing plan is presented, the user may test the software associated with the testing plan by performing the steps outlined in each of the test definitions of the test plan.

In some implementations, the request (received at step 804) may specify one or more additional application features that are desired to be tested alongside the target application feature. As noted above, one of the base application feature and the destination application feature in any given on of the test definitions retrieved at step 808 may be the target feature. In instances in which the request specifies one or more additional application features, the other one of the base application feature and the destination application feature (in the given test definition) may be specified by the request (received at step 804).

FIGS. 1-8 are provided as an example only. In this regard, at least some of the steps discussed with respect to FIGS. 1-8 may be performed in a different order, in parallel, or altogether omitted. Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
    storing, in a memory, a test database, the test database including a plurality of test definitions, each test definition being associated with a respective base application feature and a respective destination application feature;
    detecting a request to generate a testing plan;
    generating the testing plan in response to the request, the testing plan being generated by using the test database, the testing plan identifying a sequence of at least some of the test definitions that are part of the test database; and
    outputting an indication of the testing plan for presentation to a user,
    wherein the respective destination application feature of any given one of the test definitions in the sequence, except for a last test definition in the sequence, is the respective base application feature of another test definition in the sequence that immediately follows the given test definition.

2. The method of claim 1, wherein the respective base application feature of any given one of the test definitions in the sequence, except for a first test definition in the sequence, is the respective destination application feature of another test definition in the sequence that immediately precedes the given test definition.

3. The method of claim 1, wherein the respective base application feature and the respective destination application feature of at least one of the test definitions in the sequence are part of different applications.

4. The method of claim 1, wherein the respective base application feature and the respective destination application feature of at least one of the test definitions in the sequence are part of a same application.

5. The method of claim 1, wherein any of the plurality of test definitions identifies an input for the respective base application feature of that test definition.

6. The method of claim 1, wherein the respective base application feature of any of the test definitions in the sequence is configured to execute the respective destination application feature of that test definition.

7. A system, comprising:
    a memory; and
    at least one processor that is operatively coupled to the memory, the at least one processor being configured to perform the operations of:
    storing, in a memory, a test database, the test database including a plurality of test definitions, each test definition being associated with a respective base application feature and a respective destination application feature;
    detecting a request to generate a testing plan;
    generating the testing plan in response to the request, the testing plan being generated by using the test database, the testing plan identifying a sequence of at least some of the test definitions that are part of the test database; and
    outputting an indication of the testing plan for presentation to a user,
    wherein the respective base application feature of any given one of the test definitions in the sequence, except for a first test definition in the sequence, is the respective destination application feature of another test definition in the sequence that immediately precedes the given test definition.

8. The system of claim 7, wherein the respective destination application feature of any given one of the test definitions in the sequence, except for a last test definition in the sequence, is the respective base application feature of another test definition in the sequence that immediately follows the given test definition.

9. The system of claim 7, wherein the respective base application feature and the respective destination application feature of at least one of the test definitions in the sequence are part of different applications.

10. The system of claim 7, wherein the respective base application feature and the respective destination application feature of at least one of the test definitions in the sequence are part of a same application.

11. The system of claim 7, wherein any of the plurality of test definitions identifies an input for the respective base application feature of that test definition.

12. The system of claim 7, wherein the respective base application feature of any of the test definitions in the sequence is configured to execute the respective destination application feature of that test definition.

13. A non-transitory computer-readable medium storing one or more processor-executable instructions, which, when executed by at least one processor, cause the at least one processor to perform the operations of:
storing, in a memory, a test database, the test database including a plurality of test definitions, each test definition being associated with a respective base application feature and a respective destination application feature;
detecting a request to generate a testing plan;
generating the testing plan in response to the request, the testing plan being generated by using the test database, the testing plan identifying a sequence of at least some of the test definitions that are part of the test database; and
outputting an indication of the testing plan for presentation to a user,
wherein the respective destination application feature of any given one of the test definitions in the sequence, except for a last test definition in the sequence, is the respective base application feature of another test definition in the sequence that immediately follows the given test definition.

14. The non-transitory computer-readable medium of claim 13, wherein the respective base application feature of any given one of the test definitions in the sequence, except for a first test definition in the sequence, is the respective destination application feature of another test definition in the sequence that immediately precedes the given test definition.

15. The non-transitory computer-readable medium of claim 13, wherein the respective base application feature and the respective destination application feature of at least one of the test definitions in the sequence are part of different applications.

16. The non-transitory computer-readable medium of claim 13, wherein the respective base application feature and the respective destination application feature of at least one of the test definitions in the sequence are part of a same application.

17. The non-transitory computer-readable medium of claim 13, wherein any of the plurality of test definitions identifies an input for the respective base application feature of that test definition.

* * * * *